(12) United States Patent
Ng et al.

(10) Patent No.: US 10,948,040 B2
(45) Date of Patent: Mar. 16, 2021

(54) SEAT HEIGHT ADJUSTMENT ACTUATOR

(71) Applicant: SLIFE HOLDINGS INC, Midhurst (CA)

(72) Inventors: Pius Koon-Pun Ng, Markham (CA); Parth Jitendra Shahiwala, Whitby (CA)

(73) Assignee: SLIFE HOLDINGS INC, Midhurst (CA)

( * ) Notice: Subject to any disclaimer, the term of this patent is extended or adjusted under 35 U.S.C. 154(b) by 9 days.

(21) Appl. No.: 16/294,394

(22) Filed: Mar. 6, 2019

(65) Prior Publication Data

US 2020/0282872 A1 Sep. 10, 2020

(51) Int. Cl.
*F16D 67/02* (2006.01)
*B60N 2/16* (2006.01)
(Continued)

(52) U.S. Cl.
CPC .............. *F16D 67/02* (2013.01); *B60N 2/165* (2013.01); *B60N 2/167* (2013.01); *B60N 2/168* (2013.01); *F16D 11/16* (2013.01); *F16D 41/066* (2013.01)

(58) Field of Classification Search
CPC .......... F16D 67/00; F16D 67/02; F16D 11/12; F16D 11/16; F16D 41/08–105; F16D 41/18; F16D 41/063; F16D 41/066–067; B60N 2/1635; B60N 2/165; B60N 2/167; B60N 2/168; B60N 2/1864; B60N 2/1882; B60N 2/1889
See application file for complete search history.

(56) References Cited

U.S. PATENT DOCUMENTS

| 5,896,973 A | 4/1999 | Hochmuth et al. |
| 6,032,777 A | 3/2000 | Denis |

(Continued)

FOREIGN PATENT DOCUMENTS

| CN | 102233833 A | 11/2011 |
| CN | 103140374 A | 6/2013 |

(Continued)

OTHER PUBLICATIONS

Extended European Search Report dated Mar. 24, 2017 for European Patent Application No. 16196349.1.

(Continued)

*Primary Examiner* — Ernesto A Suarez
*Assistant Examiner* — James J Taylor, II
(74) *Attorney, Agent, or Firm* — Perry + Currier (57) ABSTRACT

A seat height adjustment actuator includes a brake drum fixable to a seat and defining an outer brake race. A rotatable brake hub includes a floor with a shelf, and a wall around the floor with cam surfaces defining an inner brake race. A pinion fixed to the brake hub engages a seat adjustment mechanism through the brake drum. Rolling brake elements wedge between the inner and outer brake races to lock the brake hub at rest. A clutch drum defines an outer clutch race, and includes tabs extending between the brake races to displace the brake rollers, unlocking the brake hub, under actuator input. A centering bias element on the floor simultaneously engages the shelf and a projection of the clutch drum for centering the projection over the shelf at rest. A driver cam receives actuator input and drives rotation of the clutch drum.

19 Claims, 9 Drawing Sheets

(51) Int. Cl.
*F16D 41/066* (2006.01)
*F16D 11/16* (2006.01)

(56) References Cited

U.S. PATENT DOCUMENTS

| | | | |
|---|---|---|---|
| 6,273,233 | B1 | 8/2001 | Denis |
| 6,508,347 | B1 | 1/2003 | Hochmuth |
| 6,955,251 | B2 * | 10/2005 | Kurita .................. B60N 2/1615 192/19 |
| 7,048,107 | B1 | 5/2006 | Geis et al. |
| 7,651,164 | B2 | 1/2010 | Garnier et al. |
| 8,348,344 | B2 | 1/2013 | Richard et al. |
| 8,678,154 | B2 * | 3/2014 | Kim ....................... B60N 2/167 192/38 |
| 8,820,501 | B2 | 9/2014 | Hur et al. |
| 9,541,147 | B2 * | 1/2017 | Isoda ..................... F16D 41/18 |
| 9,987,952 | B2 | 6/2018 | Chae |
| 9,994,132 | B2 | 6/2018 | Stemmer et al. |
| 10,369,903 | B2 * | 8/2019 | Ng .......................... B60N 2/167 |
| 2017/0120777 | A1 | 5/2017 | Ng et al. |
| 2018/0001794 | A1 | 1/2018 | Kim et al. |
| 2019/0210490 | A1 * | 7/2019 | Sato ........................ B60N 2/10 |

FOREIGN PATENT DOCUMENTS

| | | |
|---|---|---|
| CN | 104723910 B | 2/2017 |
| DE | 19750262 A1 | 5/1999 |
| DE | 10201301686 A1 | 2/2015 |
| EP | 1867518 A1 | 12/2007 |
| EP | 3162621 A1 | 5/2017 |
| FR | 2943592 A1 | 10/2010 |
| JP | 2011226529 A | 11/2011 |
| JP | 2012101786 A | 5/2012 |
| KR | 1020150114054 A | 10/2015 |
| KR | 101607203 B1 | 3/2016 |
| WO | WO-2008038943 A1 | 4/2008 |
| WO | WO-2014020284 A1 | 2/2014 |
| WO | WO-2014021582 A1 | 2/2014 |
| WO | WO-2015003905 A1 | 1/2015 |

OTHER PUBLICATIONS

USPTO, Non-Final Rejection, dated Sep. 5, 2018, re U.S. Appl. No. 15/283,902.
PCT/IB2020/051984, Seat Height Adjustment Actuator, dated Mar. 6, 2020.

* cited by examiner

SEAT HEIGHT ADJUSTMENT ACTUATOR

FIELD

The specification relates generally to seat adjustment mechanisms, and specifically to an actuator for a seat height adjustment mechanism.

BACKGROUND

Seats, such as those in motor vehicles, may be provided with mechanisms for adjusting the position thereof. Such mechanisms may permit, for example, the adjustment of the height of the seat. Adjustment mechanisms may be driven by manually-operated or motorized actuators. A variety of manual actuators for adjustment mechanisms are known in the art; however, such actuators may be complex arrangements of parts that are costly to produce, prone to failure, heavy or large, or any combination of the above. Further, such actuators may also be prone to creeping or unlocking, for example due to vibrations from the vehicle, and undesirably permitting movement of the seat during vehicle operation.

BRIEF DESCRIPTIONS OF THE DRAWINGS

Embodiments are described with reference to the following figures, in which.

DETAILED DESCRIPTION

Figure 1:
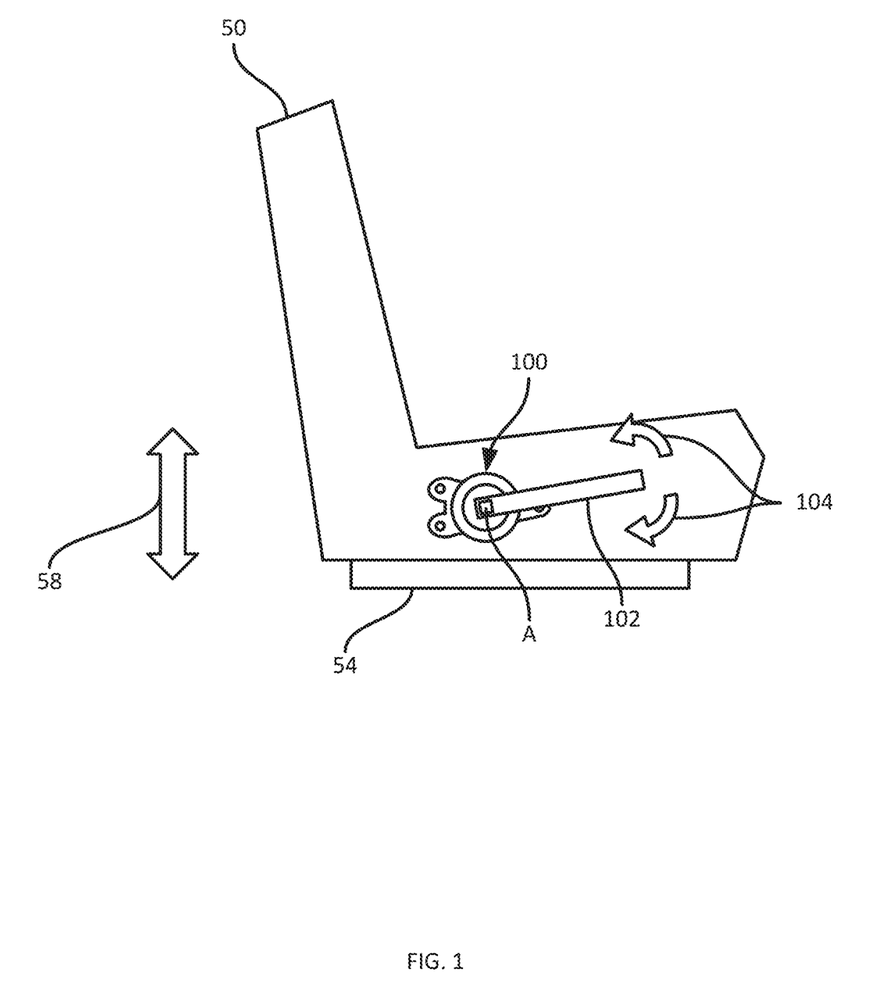
FIG. 1 depicts a seat with an actuator for a height adjustment mechanism.

FIG. 1 depicts a seat 50, such as a vehicle seat. The position of the seat 50 relative to a base 54 on which the seat 50 is supported may be adjustable in a variety of ways. In the present embodiment, at least the height of the seat 50 is adjustable. In other words, the position of the seat 50 can be adjusted in the directions indicated by an arrow 58 in FIG. 1. Such adjustments are performed by actuating a height adjustment mechanism disposed within one or both of the seat 50 and the base 54. A variety of such height adjustment mechanisms will occur to those skilled in the art, and no further discussion on such mechanisms is provided herein.

Also shown in FIG. 1 is a seat height adjustment actuator 100, also referred to herein simply as the actuator 100. The actuator 100 is fixed to the seat 50 (although the actuator 100 may alternatively be fixed to the base 54 in some embodiments, dependent upon the arrangement of the height adjustment mechanism within the seat 50 and/or the base 54)). As will be discussed in greater detail below, applying a force (e.g. by a user seated in the seat 50) to a handle 102 of the actuator 100 rotates the handle 102 about an axis A in the directions indicated by arrows 104. Rotation of the handle 102 raises or lowers the position of seat 50, according to the direction of rotation of the handle.

Figure 2A:
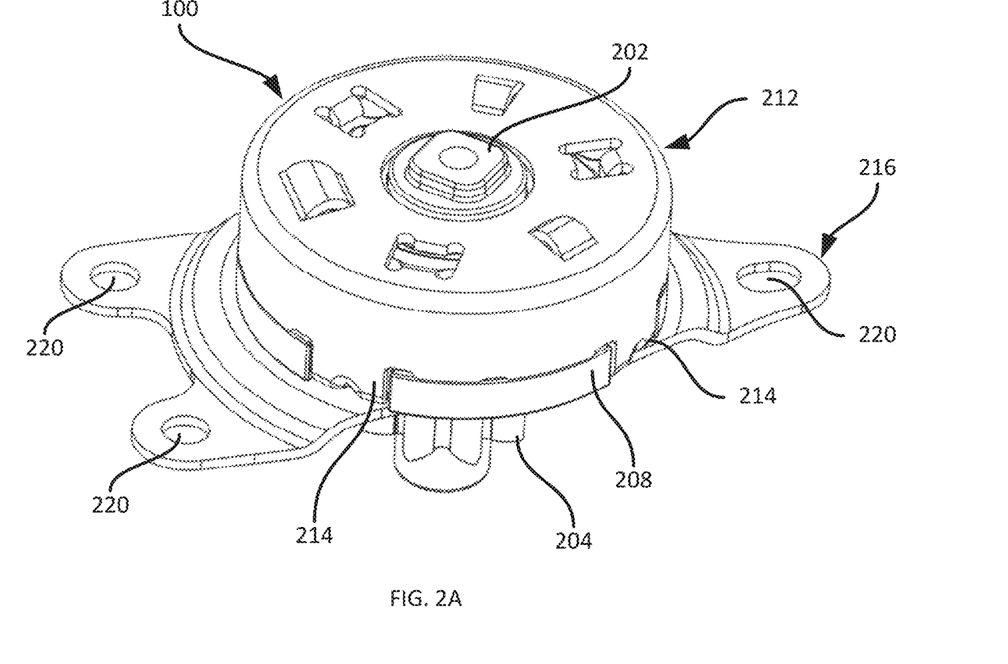
FIGS. 2A and 2B depict the assembled actuator of FIG. 1.
Figure 2B:
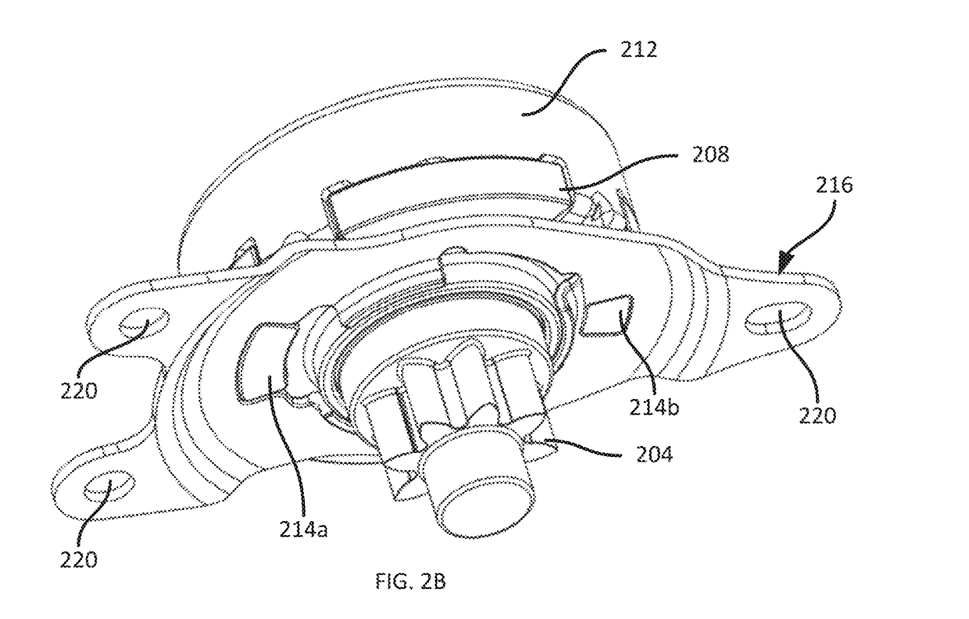

Referring now to FIGS. 2A and 2B, the actuator 100 is shown in isolation, with the handle 102 omitted. In general, as noted above, to operate the actuator 100, an actuator input is received (e.g. from a user of the seat 50) in the form of force exerted on the handle 102. The actuator input is transmitted from the handle 102 to a boss 202 coupled to the handle 102, via various components to be discussed in detail herein, to a pinion 204. The pinion 204 therefore rotates in response to the actuator input, and thus actuates the seat height adjustment mechanism (not shown).

The components of the actuator 100 are enclosed by a housing defined by a brake drum 208 and an exterior cup 212 fixed (e.g. substantially immovably attached) to the brake drum 208. The exterior cup 212 can be fixed to the brake drum 208 in a variety of ways (e.g. welding, fasteners such as bolts or rivets, and the like). In the present example, the exterior cup 212 is fixed to the brake drum 208 by way of a plurality of crimp-on tabs 214 (e.g. four crimp-on tabs 214, two of which are visible in FIGS. 2A and 2B) that are press-fitted around an outer wall of the brake drum 208 to assemble the brake drum 208 with the exterior cup 212. As will be discussed in greater detail below, the crimp-on tabs 214 and the brake drum 208 can include additional structural features to ensure correct placement of the exterior cup 212 relative to the brake drum 208 during assembly, and to mitigate movement of the exterior cup 212 relative to the brake drum 208 after assembly.

The brake drum 208, in turn, is fixed to the seat 50 and/or the base 54. In some examples, the brake drum 208 is fixed directly to the seat 50 or the base 54, e.g. via welding or other suitable fastening mechanisms. The brake drum 208 can include one or more dimples 214 (in the present example, a long dimple 214a and a short dimple 214b are shown) that cooperate with complementary depressions in the seat 50 and/or base 54 to locate the brake drum 208. In other examples, including the example illustrated in FIGS. 1 and 2A-2B, the brake drum 208 is fixed to the seat 50 and/or base 54 via a base plate 216. The brake drum 208 can be fixed to the base plate 216 in any suitable manner, including any one of or any suitable combination of mechanical interlocking (e.g. tabs on the brake drum 208 can fit into corresponding slots on the base plate 216), fasteners (e.g. bolts, adhesives and the like), welding and the like. The base plate 216, in turn, can be fixed to the seat 50 via a set of fastener holes 220 (in the present example, the base plate 216 includes three fastener holes 220) for receiving fasteners (e.g. bolts or the like) extending into corresponding threaded holes in the seat 50 and/or the base 54. As seen in FIG. 2B, the dimples 214 serve to locate the brake drum 208 relative to the base plate 216.

Figure 3:
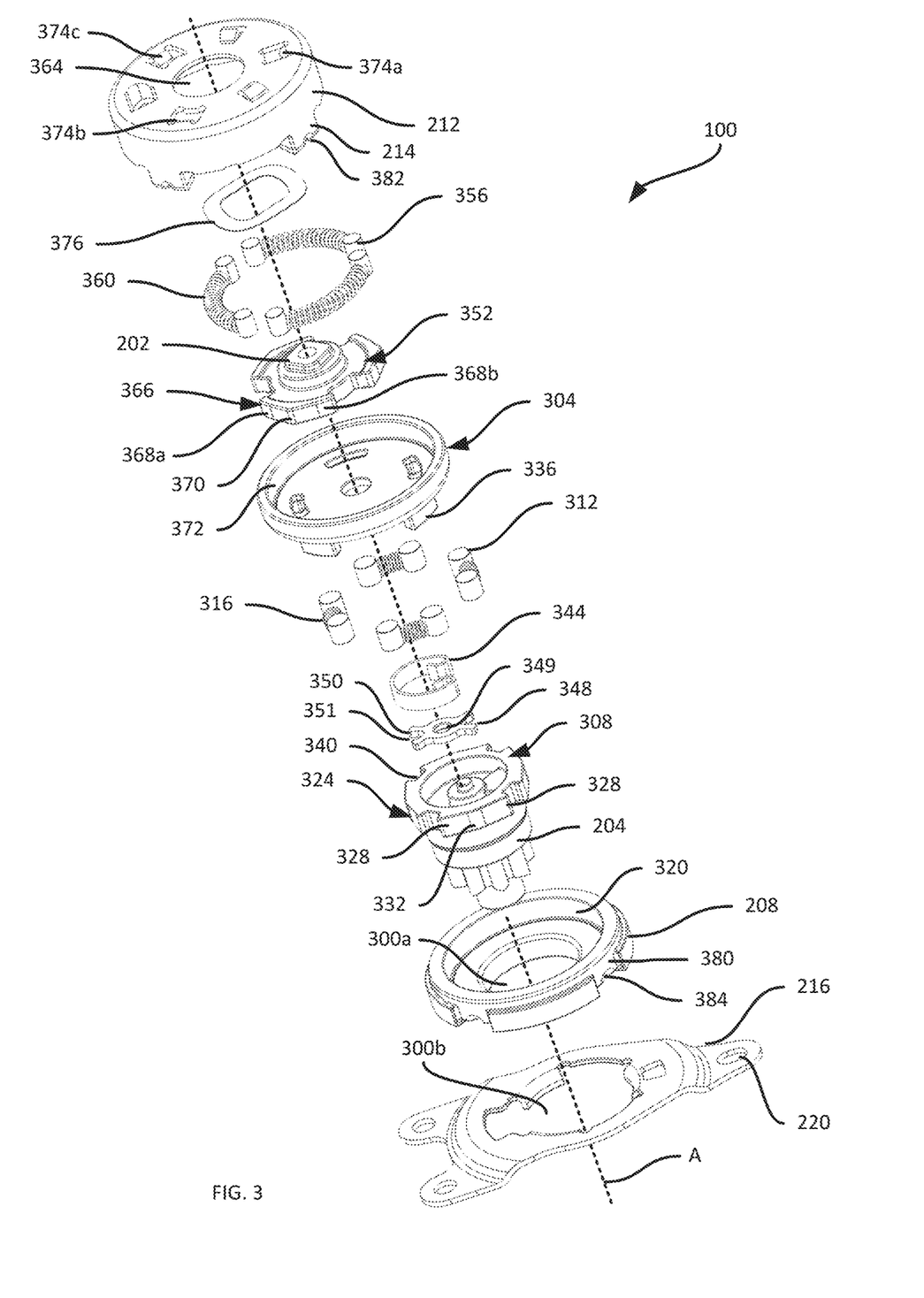
FIG. 3 depicts an exploded view of the actuator of FIGS. 2A and 2B.

Turning now to FIG. 3, an exploded view of the actuator 100 is shown, again omitting the handle 102. The actuator 100 includes a plurality of components within the above-mentioned housing (i.e. between the exterior cup 212 and the brake drum 208). The components of the actuator 100 are configured, in the absence of an actuator input (e.g. a force applied via the handle 102, such as by a user of the actuator 100), to lock the position of the pinion 204 relative to the brake drum 208. When the pinion 204 is locked, the seat height adjustment mechanism to which the pinion 204 is connected through output openings 300a in the brake drum 208 and 300b in the base plate remains stationary. The components of the actuator 100 are further configured, when an actuator input is applied via the handle 102, to unlock the pinion 204 relative to the brake drum 208. When the pinion 204 is unlocked, the actuator input is transmitted to the seat height adjustment mechanism via rotation of the pinion 204 about an axis A.

More specifically, the actuator 100 includes a clutch drum 304 configured, via interaction with additional components of the actuator 100 to be discussed herein, to rotate about the axis A in response to an actuator input. Rotation of the clutch drum 304 unlocks a brake hub 308 affixed to the pinion 204 (e.g. integrally formed with the pinion 204 or otherwise affixed to the pinion 204 by any suitable fastener), and therefore unlocks the pinion 204 itself. Rotation of the clutch drum 304 also drives rotation of the brake hub 308, hence also driving rotation of the pinion 204. In the absence of an actuator input, the brake hub 308 (and therefore the pinion 204) are once again locked relative to the brake drum 208. Transmission of actuator inputs from the clutch drum 304 to the brake hub 308, as well as locking and unlocking of the brake hub 308, are enabled by a set of rolling brake elements 312 and a corresponding set of biasing brake elements 316. In the present example, four pairs of rolling brake elements 316 are provided, with each pair having a biasing brake element 316 disposed between the members of the pair.

The rolling brake elements 312, which in the present example are roller bearings, are disposed between an outer brake race 320 defined by the brake drum 208 and an inner brake race 324 defined by the brake hub 308. The biasing brake elements 316, which in the present example are coil springs, are also disposed between the inner and outer brake races 320 and 324.

The outer brake race 320, for example, is an annular wall substantially parallel to the axis A extending from an annular surface substantially perpendicular to the axis A, and that surrounds the opening 300a. The inner brake race 324 includes a plurality of segments. In the present example, four segments are provided, with each segment corresponding to one of the pairs of rolling brake elements 312 and the corresponding brake biasing element 316, Each segment includes a pair of wedge regions 328 separated by a travel region 332. As will be discussed below in greater detail, the configuration of the inner brake race 324 is such that the rolling brake elements 312 are configured to wedge between the outer brake race 320 and the wedge regions 328 under the action of the biasing elements 316, locking the brake hub 308.

The clutch drum 304 includes a set of clutch tabs 336 equal in number to the number of pairs of rolling brake elements 312 (i.e. four in the present example, two of which are visible in FIG. 3). The clutch tabs 336, as will be discussed below, are configured to displace a subset of the rolling brake elements 312 from the wedge regions 328 towards the travel regions 332 to unlock the brake hub 308. The clutch tabs 336 are also configured to drive rotation of the brake hub 308 via engagement with notches 340 in the inner brake race 324. As seen in FIG. 3, a notch 340 is defined between each adjacent pair of segments of the inner brake race 324 (therefore, four notches 340 are provided in the illustrated example).

The actuator 100 also includes a centering bias element 344, which in the present example is an annular spring clip, and a centering plate 348 that cooperate with the brake hub 308 and the clutch drum 304 to maintain a predefined orientation of the clutch drum 304 (i.e. a predetermined position about the axis A) relative to the brake hub 308 in the absence of an actuator input. Maintaining the predefined orientation of the clutch drum 304 relative to the brake hub 308 is also referred to herein as centering the clutch drum 304. The plate 348 includes a central opening 349, and at least one pair of wings 350 (two pairs of wings, one pair on each side of the opening 349, are shown in FIG. 2) defining a slot 351 therebetween.

As set out above, application of an actuator input to the clutch drum 304 rotates the clutch drum 304, which unlocks the rolling brake elements 312 and rotates the brake hub 308 and pinion 204. The actuator input is applied to the clutch drum 304 via a driver cam 352 and a set of rolling clutch elements 356, with biasing clutch elements 360 (coil springs, in the present example) therebetween. The driver cam includes the boss 202 mentioned in connection with FIG. 2 configured to extend through an input opening 364 in the exterior cup 212, to couple with the handle 102. That is, the driver cam 352 receives the actuator input directly from the handle 102, and transmits the actuator input to the other components of the actuator 100.

The driver cam 352 also defines an inner clutch race by a set of lobes 366 (three lobes are shown in the present example). Each lobe includes a pair of wedging surfaces 368a, 368b on either side of a peak 370. The wedging surfaces 368 have greater radii relative to the axis A where they meet the peak 370 than at their furthest extends from the peak 370. The rolling clutch elements 356 (e.g. roller bearings) are configured to wedge between the wedging surfaces 368 and an outer clutch race 372 defined by the clutch drum 304. In particular, the rolling clutch elements 356 are disposed between the inner and outer clutch races in pairs (three pairs, in the present example), with the member elements 356 of each pair being biased towards wedging surfaces 368 of adjacent lobes 366. Such biasing is achieved by placement of a biasing clutch element 360 between each pair of rolling clutch elements 356, traversing the space between adjacent lobes 366.

Application of an actuator input to the handle 102 drives rotation of the driver cam 352 about the axis A. Rotation of the driver cam 352, in turn, drives one of each pair of the rolling clutch elements 356 to travel between the inner and outer clutch races in the direction of the rotation. This movement of rolling clutch elements 356 drives rotation of the clutch drum 304. The other of each pair of rolling clutch elements 356 remains stationary, as a result of cup tabs 374a, 374b, 374c extending from the exterior cup 212 between the inner and outer clutch races. The cup tabs 374, as will be described in greater detail below, are disposed between the peaks 370 and the outer clutch race 372. Thus, one of each pair of rolling clutch elements 356 is driven by the driver cam 352 toward the other of the pair, compressing the corresponding biasing clutch element 360 in the process.

When the actuator input is removed (e.g. the handle 102 is released), the compressed biasing clutch elements 360 serve to bias the above-mentioned traveling one of each pair of rolling clutch elements 356 back towards the resting position shown in FIG. 3. The return of the rolling clutch elements 360, via engagement with the wedging surfaces 368, serves to return the driver cam 352 to a resting position while the clutch drum 304 remains stationary. The cup tabs 374, as will be discussed below, are configured to repeatably bias the driver cam 352 to a rest position via decompression of the biasing clutch elements 360.

The actuator 100 may also include a spacer 376 between the driver cam 352 and the exterior cup 212, although in other examples the spacer 376 may be omitted. FIG. 3 also illustrates an example mechanism for affixing the exterior cup 212 to the brake drum 208. In particular, the exterior cup 212 includes the crimp tabs 214 (e.g. four crimp tabs 214) mentioned in connection with FIG. 2A, each corresponding to a respective channel 380 on the brake drum 208. The crimp tabs 214, during assembly of the actuator 100, can be placed within the channels 380 and deformed around the proximal or lower end (closer to the seat 50 along the axis A) of the brake drum 208. Further, the crimp tabs 214 can include indentations 382 configured to mate with complementary indents 384 in the channels 380 to locate the crimp tabs 214 prior to deformation about the brake drum 208.

Figure 4A:
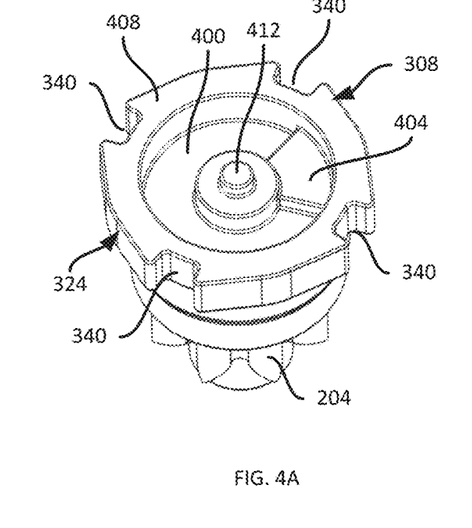
FIG. 4A depicts a brake hub of the actuator in isolation.
Figure 4B:
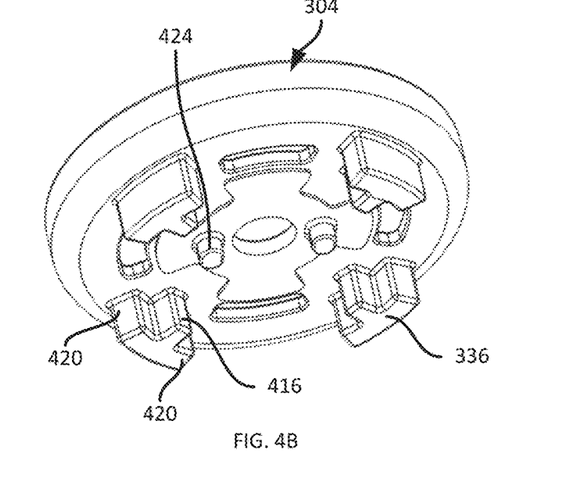
FIG. 4B depicts a clutch drum of the actuator in isolation.
Figure 4C:
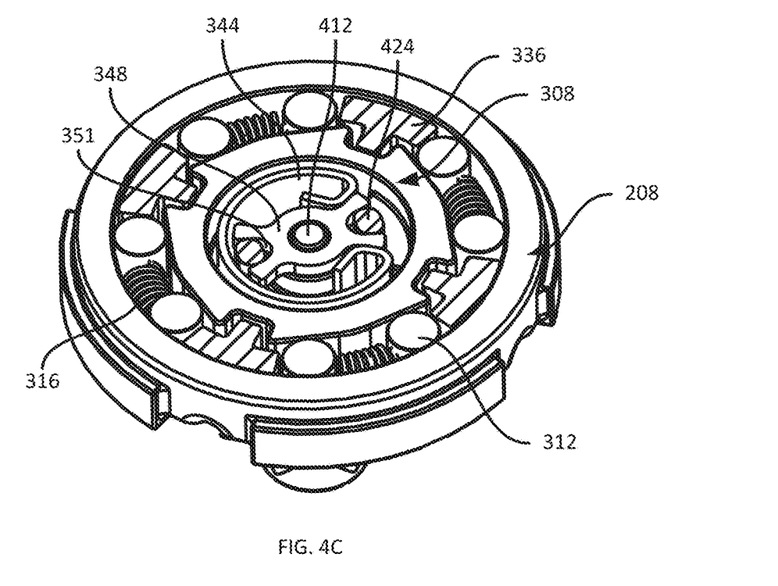
FIG. 4C depicts a partially assembled actuator with the clutch drum of FIG. 4B shown in cross-section.

Turning now to FIGS. 4A-4C, the above-mentioned centering of the clutch drum 304 relative to the brake hub 308 will be discussed in greater detail. As seen in FIG. 4A, the brake hub 308 includes a floor surface 400 substantially perpendicular to the axis A near the upper or distal (i.e. further from the seat 50 along the axis A, towards the handle 104) end of the brake hub 308. The brake hub 308 further includes a shelf 404 rising from the floor surface 400. In the present example, the shelf 404 is wedge-shaped and has an area smaller than a quarter of the area of the floor surface 400. A wall 408 surrounding the floor surface and the shelf 404 defines the inner brake race 324. In addition, the brake hub 308 includes a central post 412 that is co-axial with the axis A.

Referring to FIG. 4B, the underside of the clutch drum 304 is shown. Each of the clutch tabs 336 of the clutch drum 304 includes a driving radial spine 416 and a pair of opposing unlocking ribs 420 extending from either side of the outer end (that is, the end furthest from the axis A) of the spine 416. Thus, each clutch tab 336 is generally T-shaped. The clutch drum 304 also includes at least one projection 424 (two projections 424 are shown in the illustrated example) extending downwards.

As seen in FIG. 4C, when the actuator 100 is assembled, the brake hub 308 is received within the outer brake race defined by the brake drum 208, and the clutch drum 304 is placed overtop of the brake hub 308 and the brake drum 208 such that the clutch tabs 336 extend between the inner and outer brake races. Specifically, the spines 416 extend into the notches 340 (such that rotation of the clutch drum 304 drives rotation of the brake hub 308), and the ribs 420 are disposed between the brake races (such that rotation of the clutch drum 304 displaces the rolling brake elements 312, unlocking the brake hub 308). The centering plate 348 is rotatably mounted on the post 412, and the slots 351 receive the projections 424 of the clutch drum 304 to fix the clutch drum 304 to the plate 348. The centering bias element 344 is supported on the floor surface 400, and engages both the wings 350 of the plate 348 and the sides of the shelf 404. The wings 350 and the shelf 404 both have a common wedge-shaped profile, as seen in FIGS. 2 and 4A. The centering bias element 344 therefore acts to bias the plate 348 rotationally to lie directly over the shelf 404 in a rest position (i.e. in the absence of actuator input).

As seen in FIG. 4C, the width of the spines 416 (i.e. the arc length of the spines 416 about the axis A) is smaller than the width of the notches 340. Therefore, in the illustrated rest position, a degree of free play exists in either direction of rotation of the clutch drum 304 before the clutch tabs 336 engage with the brake hub 308. In the presence of an actuator input, the centering bias element 344 deforms, permitting the plate 348 and the clutch drum 304 to rotate out of the rest position relative to the brake hub 308, until the spines 416 contact the sides of the notches 340 and drive rotation of the brake hub 308. When the actuator input is removed, the centering bias element returns the clutch drum 308 to the rest position, in which the plate 348 is centered over the shelf 404. In other examples, the post 412 and centering plate 348 are omitted, and the projections 424 are shaped to engage directly with the centering bias element 344.

Figure 5:
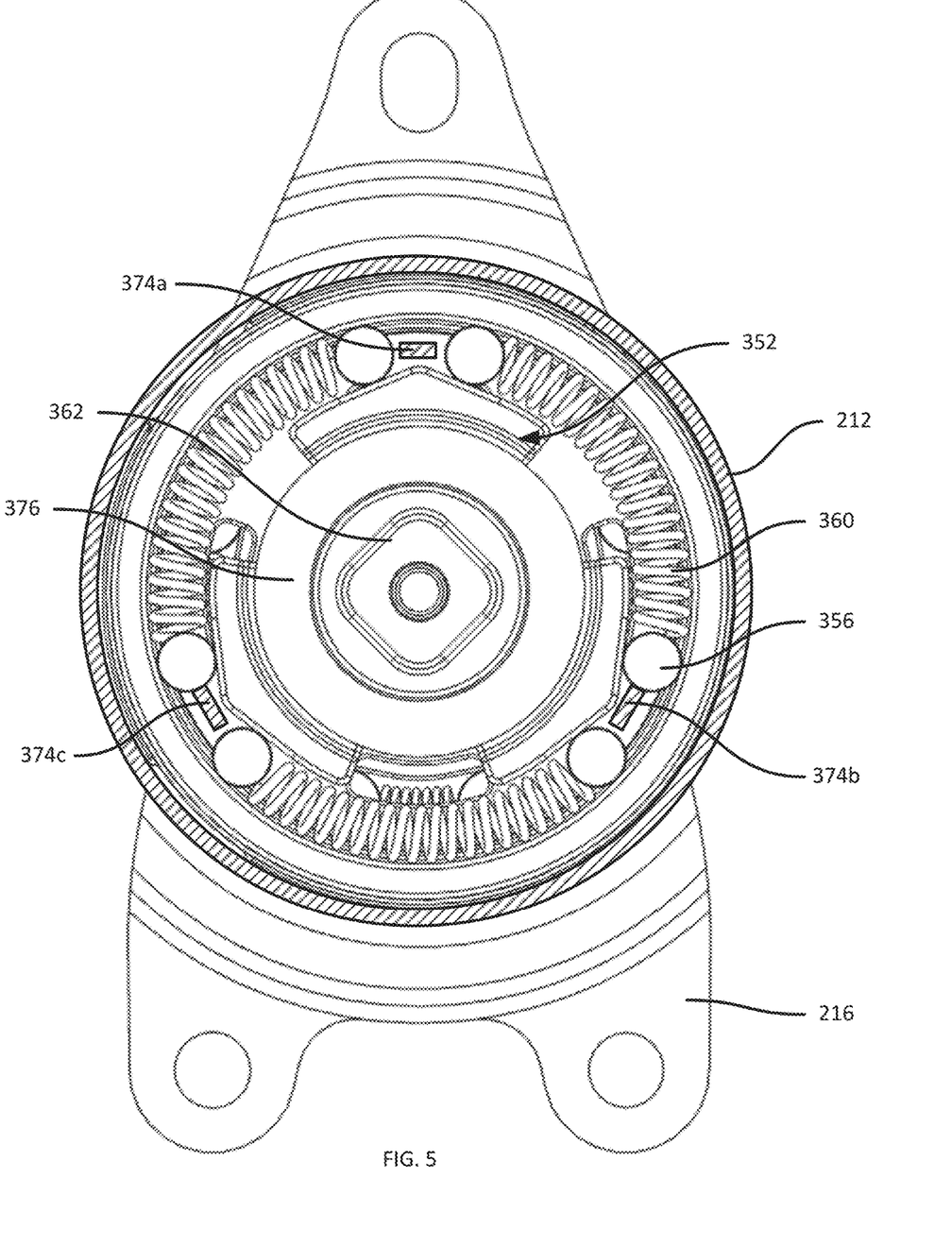
FIG. 5 depicts a partially assembled actuator with an exterior cup shown in cross-section.

Turning now to FIG. 5, a partially assembled view of the actuator 100 illustrates the configuration of the cup tabs which, as mentioned above, returns the driver cam 352 and therefore the handle 102 (via the boss 202) to a predefined resting position. As noted above, the exterior cup 212, which is shown in cross-section in FIG. 5, includes three tabs 374a, 374b and 374c. When the actuator 100 is assembled, each tab 374 extends between the inner and outer clutch races adjacent to a peak 370 of a lobe 366 of the driver cam 352. Further, a primary one of the tabs 374a is sized such that, at rest, neither of the adjacent rolling clutch elements 356 contacts the tab 374a. The remaining two tabs 374b and 374c are longer than the tab 374a, and positioned such that they contact the one of their adjacent rolling clutch elements 356 closest to the primary tab 374a, while not contacting the one of their adjacent rolling clutch elements 356 furthest from the primary tab 374a.

Contact between the tabs 374b and 374c and respective rolling clutch elements 356 compresses the biasing clutch elements 360 between the tab 374b and 374a, and between the tab 374c and 374a. The biasing clutch element 360 between the tabs 374b and 374c is also compressed, but simply biases the rolling clutch elements 356 that it contacts in opposite directions, as neither of those rolling clutch elements 356 is in contact with a cup tab 374. Therefore, in the absence of an actuator input, the compressed biasing clutch elements 360 between the tab 374b and 374a, and between the tab 374c and 374a each act to bias the driver cam 352 in opposing directions, resulting in maintenance of the driver cam 352 in the resting position shown in FIG. 5.

Figure 6A:
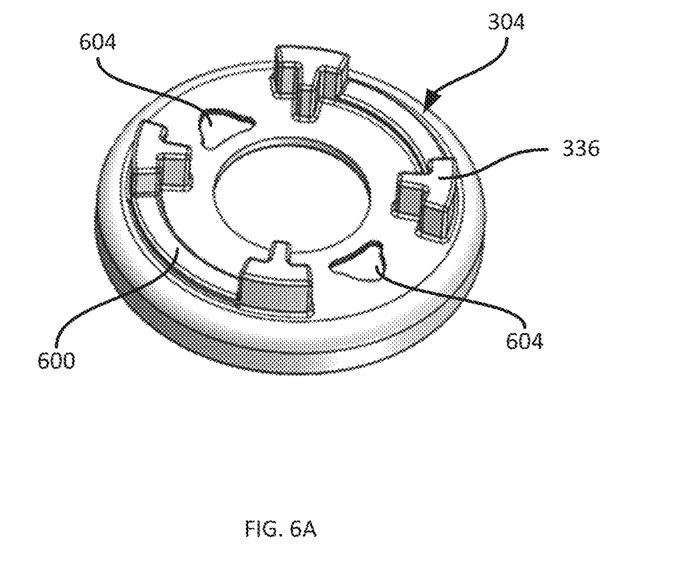
FIG. 6A depicts additional features of the clutch drum of the actuator of FIG. 1.

In some embodiments, the actuator 100 includes additional features for mitigating or eliminating creep between the brake hub 308 and the brake drum 208. In other embodiments, the features discussed below are omitted. In particular, turning to FIG. 6A, the underside of the clutch drum 304 is shown according to another embodiment. The clutch drum 304 includes the clutch tabs 336 as discussed above. The clutch drum 304 also includes a running pad 600 comprising a plurality of a discrete segments (two segments, in the present embodiment). Finally, the clutch drum 304 includes a pair of opposed depressions 604 extending into the underside of the clutch drum 304. The function of the depressions 604 will be described below in greater detail.

Figure 6B:
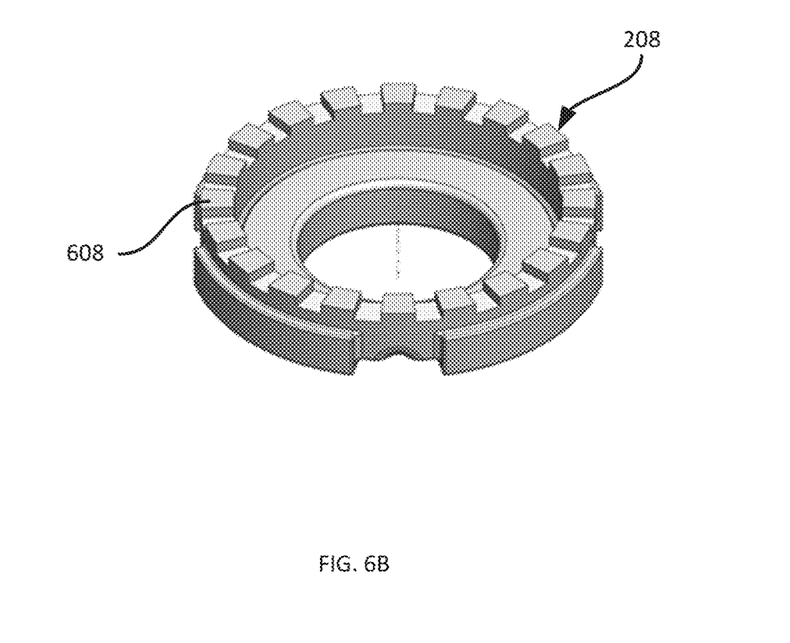
FIG. 6B depicts additional features of the brake drum of the actuator of FIG. 1.
Figure 7A:
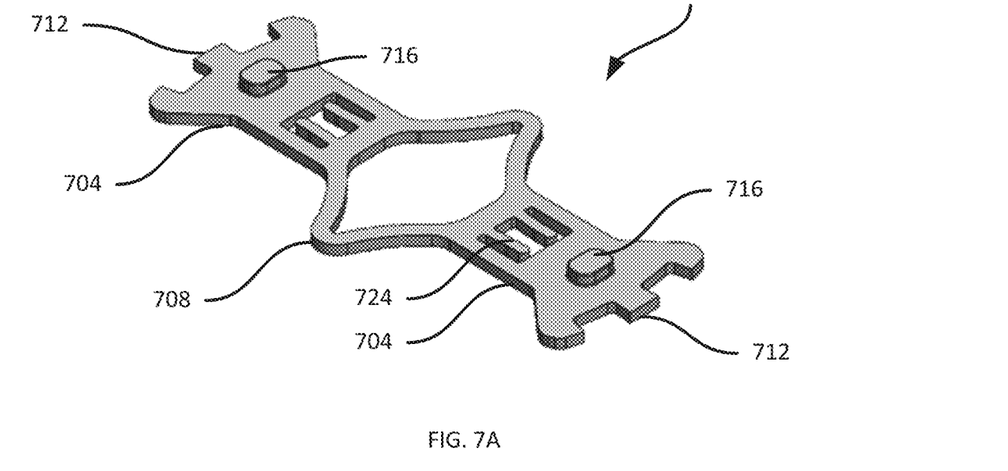
FIG. 7A depicts an anti-creep insert for the actuator of FIG. 1.

In some embodiments, the actuator 100 includes additional structural features to reduce or eliminate small movements (also referred to as creep) of the brake hub 308 relative to the brake drum 304 when the brake hub 308 is locked. In such embodiments, as shown in FIG. 6B, the brake drum 208 can include a plurality of locking channels, defined in the present example by crenellations 608. Referring to FIG. 7A, the actuator 100 in such embodiments also includes an anti-creep insert 700. The insert 700 includes a pair of opposing arms 704 joined by a resiliently deformable central body 708. The body 708 is biased towards a first position (e.g. the resting position of the body 708 is the first position, and the body 708 therefore resists movement away from the first position) in which the arms 704 are at a given distance from each other. The body 708 can also be deformed into a second position, in which the arms 704 are brought closer to each other.

Each arm 704 includes teeth 712 sized to engage with the crenellations 608 shown in FIG. 6B. In the first position mentioned above, the teeth 712 of one arm 704 are further apart from the teeth 712 of the other arm 704 than in the second position. The insert 700 transitions between the first and second positions via interaction between a protrusion 716 on each arm with the depressions 604 of the clutch drum 304 shown in FIG. 6A, as will be described below.

Figure 7B:
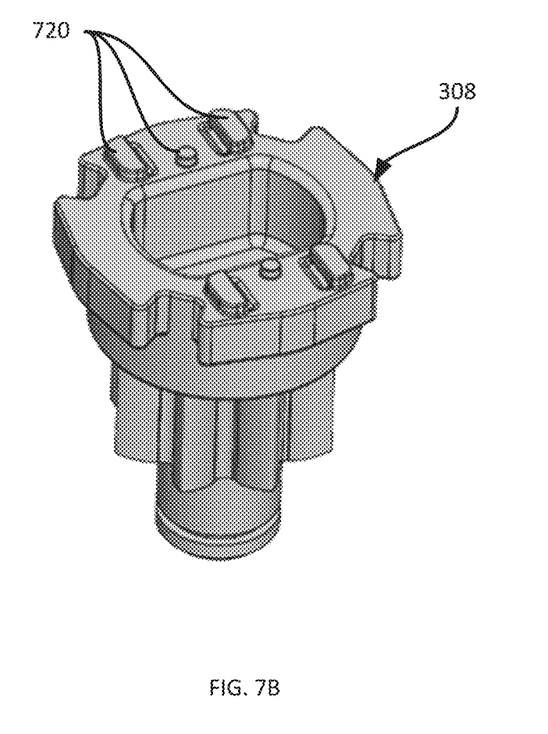
FIG. 7B depicts additional features of the brake hub of the actuator of FIG. 1.
Figure 8A:
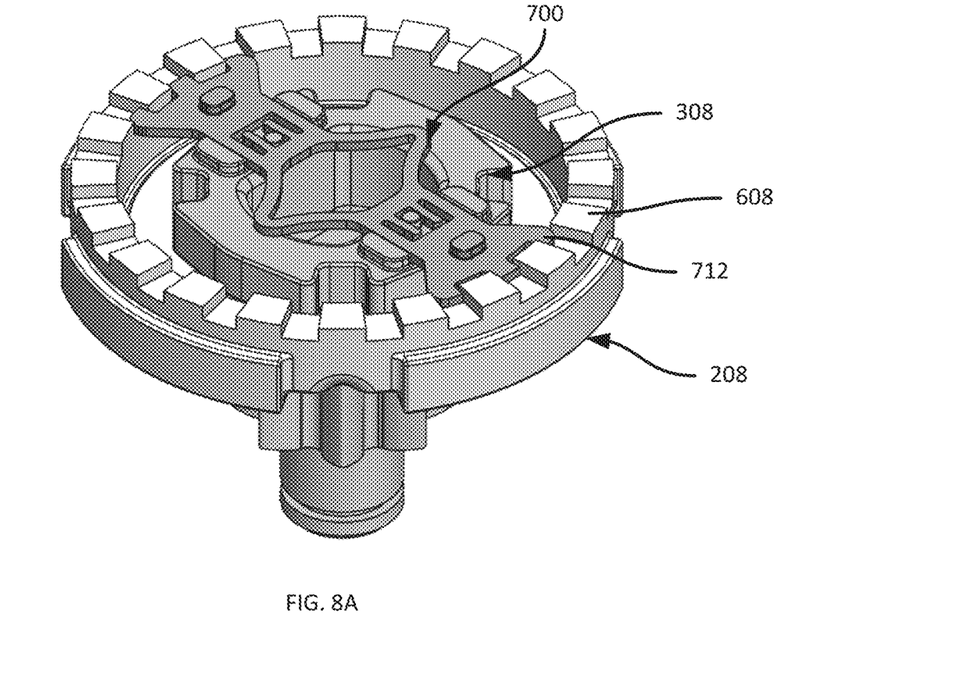
FIG. 8A depicts the brake hub, brake drum and anti-creep insert in an assembled configuration.
Figure 8B:
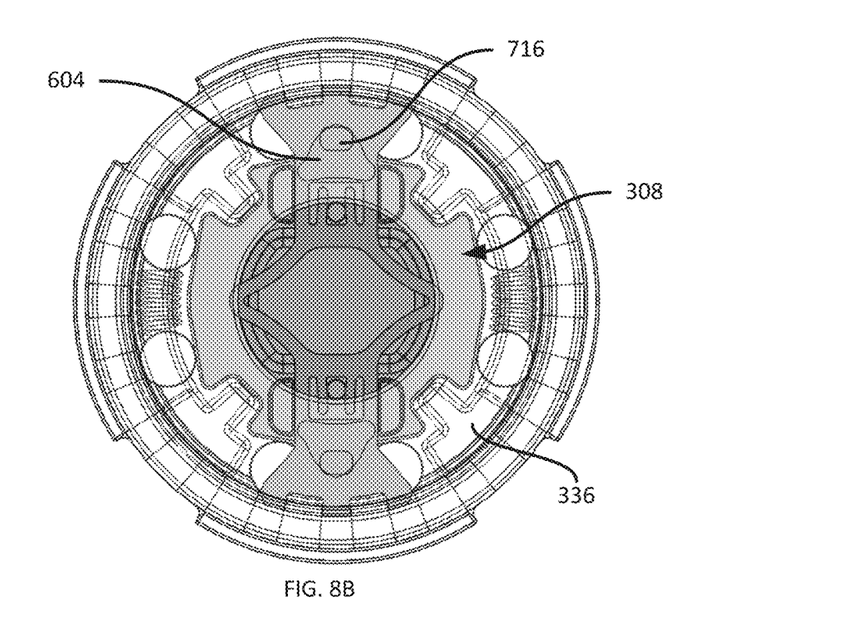
FIG. 8B depicts the brake hub, brake drum, anti-creep insert and clutch drum in an assembled configuration.

Referring to FIG. 7B, the brake hub 308 includes guide members 720 for engaging with corresponding channels 724 of the insert 700 (see FIG. 7A) to couple the insert 700 to the brake hub 308. As will now be apparent, when the insert 700 is so coupled, the arms 704 are still permitted to slide between the above-mentioned first and second positions. FIG. 8A depicts the insert 700 assembled with brake hub 308, which in turn is inserted within the brake drum 208. As seen in FIG. 8A, in the first position, the teeth 712 engage with the crenellations 608, preventing movement of the brake hub 308 relative to the brake drum 208. FIG. 8B depicts the brake hub 308 assembled with the brake drum 208 from above, and illustrates the clutch tabs 336 (the clutch drum 304 is illustrated as transparent) engaged with the notches 340. As seen in FIG. 8B and as noted earlier, the notches 340 are wider than the spines of the clutch tabs 336. Therefore, the clutch drum 304 is permitted a certain amount of movement responsive to an actuator input before causing the brake hub 308 to move.

Figure 9:
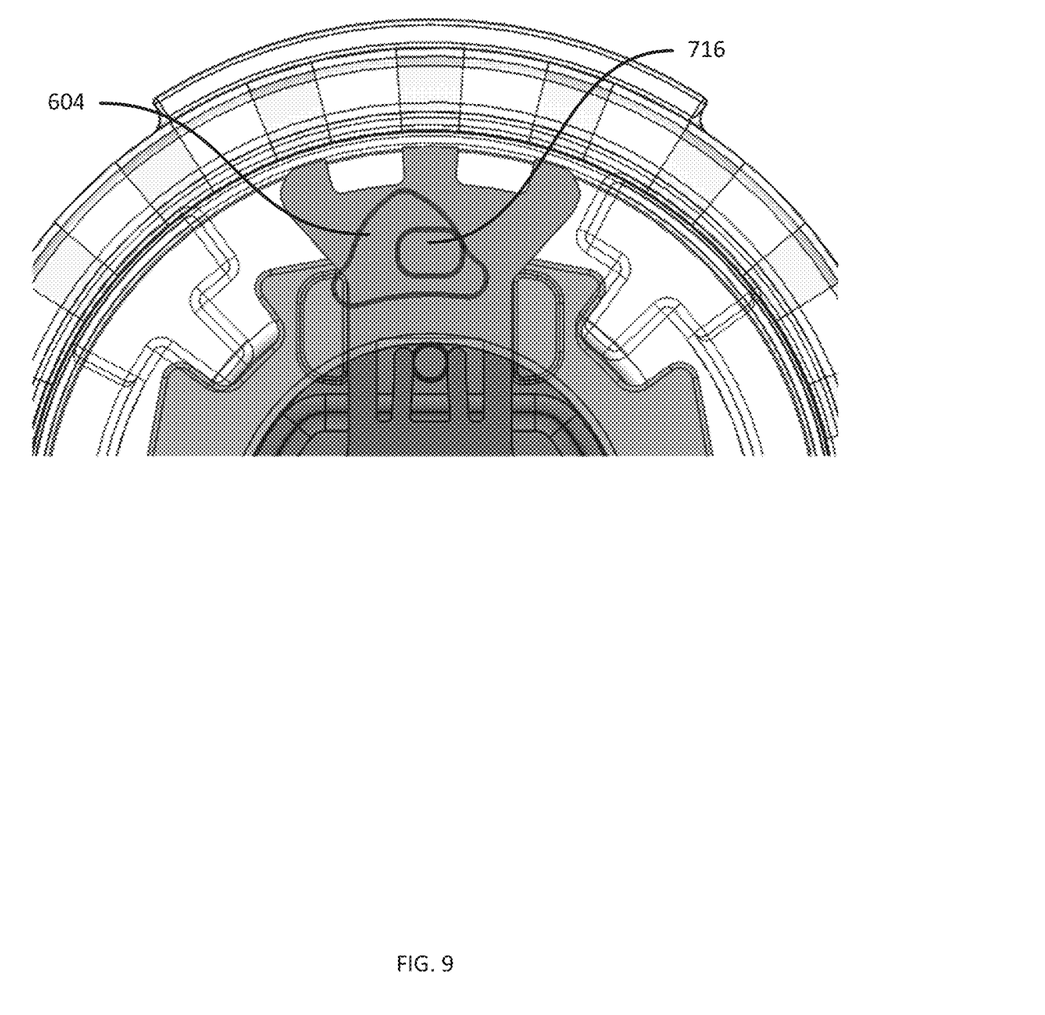
FIG. 9 depicts a partial view of FIG. 8B with the anti-creep insert in a disengaged position.

Also shown in FIG. 8B is the engagement between the protrusions 716 and the depressions 604. As will now be apparent, when the clutch drum 304 rotates relative to the brake hub 308 (which is permitted by the clearance between the sides of the notches 340 and the spines of the clutch tabs 336), the angled walls of each depression 604 force the corresponding protrusion 716 inwards (towards the axis A). In other words, rotation of the clutch drum 304 causes the insert 700 to transition to the second position, disengaging the teeth 704 from the crenellations 608. Further rotation of the clutch drum 304 causes rotation of the brake hub 308 as described earlier. FIG. 9 illustrates the insert 700 in the second, or disengaged, position.

When the actuator input ceases (e.g. the handle 102 is released), the body 708 of the insert 700 may force the clutch drum 304 (which is no longer under load) to rotate relative to the brake hub 312 to center the protrusions 716 at the peaks of the depressions 604, returning the insert 700 to the first, engaged position. Alternatively, if the teeth 712 are abutted against the crenellations 608, such rotation may not be possible. However, if the brake assembly of the actuator 100 experiences any creep, the teeth 712 will be brought into a position in which they can engage with the crenellations 608, permitting the insert 700 to return to the first position and prevent further creep.

The scope of the claims should not be limited by the embodiments set forth in the above examples, but should be given the broadest interpretation consistent with the description as a whole.

The invention claimed is:

1. A seat height adjustment actuator, comprising:
    a brake drum fixable to a seat, the brake drum defining an output opening and an outer brake race around the output opening;
    a brake hub rotatable within the outer brake race, the brake hub including:
        (i) a floor surface having a shelf rising therefrom; and
        (ii) surrounding the floor surface and the shelf, a wall having a plurality of brake cam surfaces defining an inner brake race;
    a pinion fixed to the brake hub and extending through the output opening to engage a seat adjustment mechanism of the seat;
    between the inner and outer brake races, rolling brake elements configured to wedge between the outer brake race and respective brake cam surfaces to lock the brake hub relative to the brake drum in the absence of an actuator input;
    a clutch drum rotatably supported adjacent to the inner and outer brake races, the clutch drum defining an outer clutch race, and having:
        (i) clutch tabs extending between the inner and outer brake races to unlock the brake hub by displacing the rolling brake elements in response to the actuator input; and
        (ii) a projection extending toward the shelf of the brake hub;
    a centering bias element supported by the floor surface to simultaneously engage the shelf and the projection for centering the projection over the shelf in the absence of the actuator input;
    a driver cam, for receiving the actuator input, rotatable within the outer clutch race and defining an inner clutch race;
    between the inner and outer clutch races, rolling clutch elements for transmitting the actuator input to the clutch drum and for permitting rotation of the driver cam relative to the clutch drum in the absence of the actuator input; and
    an exterior cup fixed to the brake drum to enclose the brake hub, the rolling brake elements, the clutch drum, the driver cam and the rolling clutch elements; the exterior cup having an input opening therethrough.

2. The seat height adjustment actuator of claim 1, wherein the driver cam includes a boss configured to extend through the input opening for coupling with a handle.

3. The seat height adjustment actuator of claim 1, wherein each clutch tab has a width that is smaller than a distance between ones of the rolling brake elements adjacent to the clutch tab.

4. The seat height adjustment actuator of claim 3, wherein when the actuator input is received, the centering bias element deforms to permit movement of the projection away from a centered position over the shelf.

5. The seat height adjustment actuator of claim 1, wherein the centering bias element is an annular spring clip.

6. The seat height adjustment actuator of claim 5, wherein the shelf is wedge-shaped.

7. The seat height adjustment actuator of claim 6, further comprising a centering plate rotatably mounted on the shelf; the centering plate defining a slot between a pair of wings such that the projection is received within the slot; wherein the centering bias element engages the wings and the shelf simultaneously to center the projection over the shelf in the absence of the actuator input.

8. The seat height adjustment actuator of claim 1, further comprising:
    biasing clutch elements between respective pairs of the rolling clutch elements.

9. The seat height adjustment actuator of claim 8, wherein the exterior cup includes a set of cup tabs extending between the inner and outer clutch races to separate adjacent pairs of the rolling clutch elements.

10. The seat height adjustment actuator of claim 9, wherein a primary one of the cup tabs has a first width such that in the absence of the actuator input, the rolling clutch elements do not contact the primary tab.

11. The seat height adjustment actuator of claim 10, wherein second and third ones of the cup tabs have a second width greater than the first width such that in the absence of the actuator input, the second cup tab contacts one of the rolling clutch elements between the second cup tab and the primary cup tab, and the third cup tab contacts another one of the rolling clutch elements between the third cup tab and the primary cup tab.

12. The seat height adjustment actuator of claim 11, wherein the contact between the second and third tabs and the corresponding rolling clutch elements compresses corresponding ones of the biasing clutch elements to center the driver cam relative to the exterior cup.

13. The seat height adjustment actuator of claim 1, wherein the brake drum is affixed directly to the seat.

14. A seat height adjustment actuator, comprising:
- a brake drum fixable to a seat, the brake drum (i) defining an output opening and an outer brake race around the output opening, and (ii) including a plurality of locking channels arranged about the outer brake race;
- a brake hub rotatable within the outer brake race, the brake hub including a wall having a plurality of brake cam surfaces defining an inner brake race;
- an anti-creep insert mounted on the brake hub and rotationally fixed with the brake hub;
- the anti-creep insert being deformable between a locked position for engaging with the locking channels, and an unlocked position for disengaging from the locking channels;
- a pinion fixed to the brake hub and extending through the output opening to engage a seat adjustment mechanism of the seat;
- between the inner and outer brake races, rolling brake elements configured to wedge between the outer brake race and respective brake cam surfaces to lock the brake hub relative to the brake drum in the absence of an actuator input;
- a clutch drum rotatably supported adjacent to the inner and outer brake races, the clutch drum defining an outer clutch race, and having clutch tabs extending between the inner and outer brake races to unlock the brake hub by displacing the rolling brake elements in response to the actuator input;
- a driver cam, for receiving the actuator input, rotatable within the outer clutch race and defining an inner clutch race;
- between the inner and outer clutch races, rolling clutch elements for transmitting the actuator input to the clutch drum and for permitting rotation of the driver cam relative to the clutch drum in the absence of the actuator input; and
- an exterior cup fixed to the brake drum to enclose the brake hub, the rolling brake elements, the clutch drum, the driver cam and the rolling clutch elements; the exterior cup having an input opening therethrough.

15. The seat height adjustment actuator of claim 14, wherein the brake drum includes crenellations surrounding the outer brake race and defining the locking channels.

16. The seat height adjustment actuator of claim 15, wherein the anti-creep insert further includes protrusions complementary to the crenellations extending outwards from first and second ends thereof.

17. The seat height adjustment actuator of claim 14, wherein the anti-creep insert has a first length in the locked position, and a second length in the unlocked position, the first length being greater than the second length.

18. The seat height adjustment actuator of claim 14, wherein the brake hub includes a set of guide members, and wherein the anti-creep insert includes a set of guide channels for receiving the guide members to rotationally fix the anti-creep insert relative to the brake hub.

19. The seat height adjustment actuator of claim 14, wherein the anti-creep insert includes protrusions extending toward the clutch drum; and
- wherein the clutch drum includes depressions in a lower surface thereof for receiving the protrusions; the depressions having angled walls to transition the anti-creep insert between the locked and unlocked positions responsive to rotation of the clutch drum.

* * * * *